(No Model.)
C. H. CAMPBELL.
APPARATUS FOR SECURING THE ABSORPTION OF EXHAUST AMMONIA GAS FROM AMMONIA ENGINES.
No. 427,397.  Patented May 6, 1890.
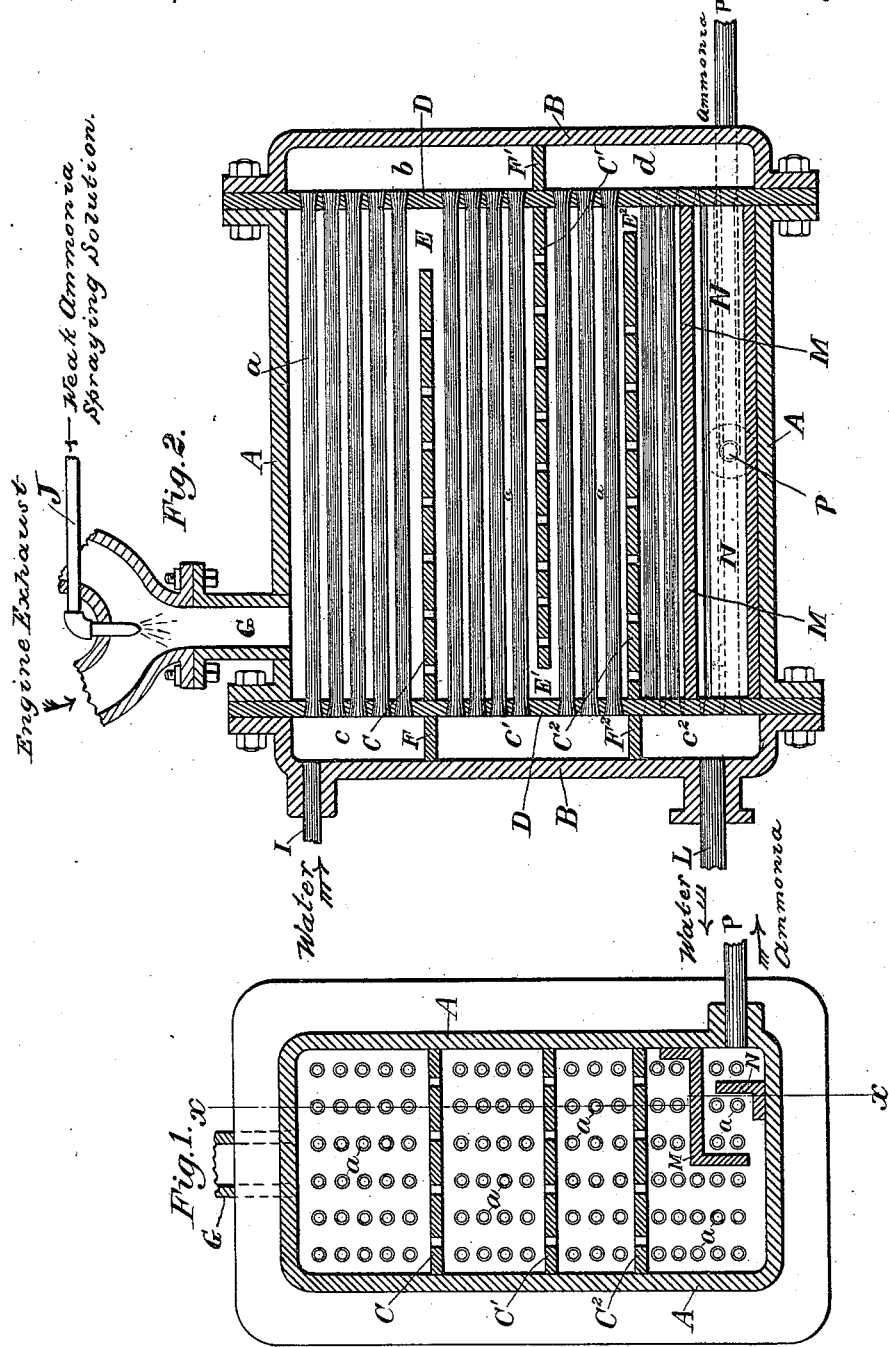

UNITED STATES PATENT OFFICE.

CHARLES H. CAMPBELL, OF NEW YORK, N. Y.

APPARATUS FOR SECURING THE ABSORPTION OF EXHAUST AMMONIA-GAS FROM AMMONIA-ENGINES.

SPECIFICATION forming part of Letters Patent No. 427,397, dated May 6, 1890.

Application filed February 4, 1889. Renewed December 16, 1889. Serial No. 333,842. (No model.)

*To all whom it may concern:*

Be it known that I, CHARLES H. CAMPBELL, of the city, county, and State of New York, have invented a new and useful Improvement in Apparatus for Securing the Absorption of Exhaust Ammonia-Gas from Ammonia-Engines, of which the following is a full, clear, and exact description.

My invention is designed as an improvement in the ammonia-absorbers invented by Joseph H. Campbell and used in connection with his ammonia-plant as described and claimed in his various United States patents—viz., Nos. 337,371, 337,372, 337,373, and 337,374, of March 9, 1886, No. 346,425, of July 27, 1886, and Nos. 399,131 and 399,132, of March 5, 1889.

In the Campbell engine apparatus to which I have just referred aqua-ammonia is placed in a generator, which is heated by steam or otherwise. The heat causes the separation of ammonia-gas from the water, which gas is used to operate a suitable engine. The exhaust-gas from the engine is then brought into contact with the liquid from the generator, which has now become a weak solution of ammonia, and having been cooled on its passage enters the exhaust-pipe of the engine and passes with the exhaust-gas into a vessel, where the gas and weak solution are thoroughly cooled and mixed, the object being to cause the weak solution to absorb all the exhaust-gas from the engine, thus becoming once more a strong solution, in which condition it is returned to the generator. It will thus be seen that a perfect circulation of the ammonia solution is kept up so that, excepting for unavoidable leakage, there is no waste to be supplied, and that by means of heat and cold properly applied the operation of the engine is maintained. The more or less successful operation of this system depends largely on the more or less perfect absorption of the exhaust ammonia-gas from the engine, and the difficulty in securing this result arises from the difficulty of securing the intimate admixture of the gas and weak solution and the reducing of the weak solution, which passes hot from the generator, to a sufficiently low temperature to secure the necessary condition of absorption, as the capacity of water to absorb ammonia-gas and to retain it when absorbed diminishes rapidly as its temperature is increased.

In order to enable others skilled in the art to construct and use my improvement, I will describe its construction and operation.

In the accompanying drawings, Figure 1 is a vertical cross-section of the absorber to which my improvement is applied. Fig. 2 is a longitudinal elevation, partly in section, the section being on the line $x$ $x$ of Fig. 1.

The absorber A is made of iron, preferably cast-iron, and may be of oblong rectangular shape. It has a double head at each end, each formed by a cap B, bolted to the main body of the absorber. It is furnished with a series of pipes $a$ $a$, &c., arranged horizontally and opening at each end into the water-way formed by the cap B, after the manner of a tubular boiler.

The interior of the absorber may be divided into three or more divisions or chambers by means of horizontal diaphragms C C' $C^2$, which may be perforated, so as to allow the passage of liquid and gas therethrough. These diaphragms are each attached at one end to the tube-plate or head D, leaving a passage-way E at the other end, and they are arranged so that the space E E', &c., may be alternately at opposite ends corresponding in position to the diaphragms C C', &c., and partitions F F', &c., in the water-way, at one end of the absorber, and a partition F at the other end, thus dividing the space inclosed by the cap B at one end of the absorber into three water-ways, (marked $c$ $c'$ $c^2$,) and at the other end into two water-ways $b$ and $d$. If the number of partitions F is reduced or increased the number of water-ways is altered correspondingly.

G is the exhaust-pipe from the cylinder of the ammonia-engine, and J is a pipe terminating in a jet, which conducts the weak solution from the generator to the exhaust-pipe, in which it is sprayed downward in the direction of the exhaust toward the absorber. The exhaust-pipe G enters the main body of the absorber in the upper chamber, and a pipe I, leading from a pump or head of water, conducts water into the water-way C at one end of the absorber. The water thus introduced traverses the interior of the series of pipes in the upper division, thence passes to the second water-way b, thence through the pipes in the second division to the water-way c' at the other end, thence through the pipes in the third division to the water-way d, and thence through the series of pipes in the lowest division to the water-way c², from which a pipe L conducts the water away from the absorber.

So far as I have described it, the absorber is the same as invented by Joseph H. Campbell, for use with his ammonia-engine, and the operation is as follows: The exhaust-gas from the engine encounters the spray of weak ammonia-water from the generator at the jet, part of the gas is absorbed by the liquid, and the remainder is carried by adhesion (and partly also by means of a vacuum-pump applied to the absorber) through the exhaust-pipe into the interior of the absorber. Here the mingled weak solution and gas are drawn downward around the series of pipes (cooled internally by water) through the perforations in the diaphragm and through the space at its end into the second chamber or division of the absorber, and so on around the pipes and through and over the diaphragm to the lowest point, where the ammonia solution now becomes a strong solution by the absorption of gas, and is drawn out through the exit-pipe P on its way back to the generator. Experience has proved that even this arrangement, excellent though it is, does not effect a perfect absorption of the gas, owing to the well-known difficulty of controlling the mutual action of gas and water.

My invention is designed to overcome this difficulty and to secure the absorption of the remaining gas not yet absorbed when the liquid is about to pass out of the absorber. For this purpose I place inside of the absorber an L-shaped plate M, extending entirely from one end to the other, covering the exit-pipe and so close to the bottom of the vessel that only a narrow space remains between its lower edge and the bottom plate of the absorber. Inside of the space thus inclosed by the L-shaped plate is an upright plate N, attached to the bottom of the absorbers and extending nearly up to, but not quite touching, the lower side of the horizontal part of the L-shaped plate M. This construction is shown clearly in Fig. 1. The effect of this arrangement is that the space inclosed by the L-shaped plate and the upright plate N is constantly filled with liquid to the height of the upper edge of the upright plate N, and that as no gas can escape except through the exit-pipe P, (the mouth of which is inclosed by the L-shaped plate M,) all free gas attempting to pass out of the absorber must enter the space inclosed by the L-shaped and upright plates M and N, and pass through the body of liquid imprisoned therein. A gas-trap is thus formed through which no free gas can escape, and if it accumulates sufficiently to force its way through the water the quantity is so small that it cannot escape absorption by the liquid, if that be sufficiently cool.

A practical test of this improvement has demonstrated its efficiency to secure the desired result.

I have described the absorber to which my improvement is applied as having tubes and diaphragms; but these are not necessary to the operation of my improvement, but add to its efficiency by tending to secure a more perfect absorption of the gas with the absorbing-liquid.

What I claim as my invention, and desire to secure by Letters Patent, is—

1. In an apparatus for effecting the absorption of the exhaust-gas from an ammonia-engine with the absorbing-liquid, the combination of a vessel having an opening or openings for receiving the exhaust-gas and absorbing-liquid, and an exit-pipe at the lower end of the vessel inclosed by a liquid-trap, constructed substantially as described, to interpose between the entrance-gas and liquid-pipes and the exit-pipe a body of absorbing-liquid, through which any free gas must pass before reaching the exit-pipe, substantially as described.

2. The combination, in an ammonia-engine apparatus, with the absorbing-vessel A, furnished with cold-water pipes or other suitable refrigerating apparatus, and having an entrance pipe or pipes for the exhaust-gas from the engine and the absorbing-liquid, and an exit-pipe at the lower end of a liquid-gas trap consisting of the plates M and N, arranged relatively to the exit-pipe, substantially as described, to prevent the escape of free gas without passing through the liquid in the trap, substantially as described.

In testimony whereof I have hereunto set my hand this 31st day of January, A. D. 1889.

CHARLES H. CAMPBELL.

Witnesses:
B. SEAMAN,
V. L. HORACK.